(12) United States Patent
Hou et al.

(10) Patent No.: US 11,423,625 B2
(45) Date of Patent: Aug. 23, 2022

(54) AUGMENTED REALITY SCENE IMAGE PROCESSING METHOD AND APPARATUS, ELECTRONIC DEVICE AND STORAGE MEDIUM

(71) Applicant: BEIJING SENSETIME TECHNOLOGY DEVELOPMENT CO., LTD., Beijing (CN)

(72) Inventors: Xinru Hou, Beijing (CN); Qing Luan, Beijing (CN); Chongshan Sheng, Beijing (CN); Fei Jiao, Beijing (CN); Huafu Ou, Beijing (CN); Shengchuan Shi, Beijing (CN); Nan Wang, Beijing (CN); Hanqing Jiang, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/134,811

(22) Filed: Dec. 28, 2020

(65) Prior Publication Data

US 2021/0118237 A1 Apr. 22, 2021

Related U.S. Application Data

(63) Continuation of application No. PCT/CN2020/112707, filed on Aug. 31, 2020.

(30) Foreign Application Priority Data

Oct. 15, 2019 (CN) .......................... 201910979900.8

(51) Int. Cl.
*G06T 19/00* (2011.01)
*G06V 10/75* (2022.01)

(52) U.S. Cl.
CPC .......... *G06T 19/006* (2013.01); *G06V 10/751* (2022.01)

(58) Field of Classification Search
None
See application file for complete search history.

(56) References Cited

U.S. PATENT DOCUMENTS 10,126,837 B1 * 11/2018 Bergstrom .............. G06F 3/017
10,262,464 B2 * 4/2019 Anderson ................. G06T 7/70
(Continued)

FOREIGN PATENT DOCUMENTS

CN 106774937 A 5/2017
CN 106980381 A 7/2017
(Continued)

OTHER PUBLICATIONS

International Search Report in the international application No. PCT/CN2020/112707, dated Oct. 28, 2020, 3 pgs.
(Continued)

*Primary Examiner* — David H Chu
(74) *Attorney, Agent, or Firm* — Cooper Legal Group, LLC

(57) ABSTRACT

An Augmented Reality (AR) scene image processing method, an electronic device and a storage medium are provided. The method includes that: shooting pose data of an AR device is acquired; presentation special effect data of a virtual object corresponding to the shooting pose data in a reality scene is acquired based on the shooting pose data and position pose data of the virtual object in a three-dimensional scene model representing the reality scene; and an AR scene image is displayed through the AR device based on the presentation special effect information.

16 Claims, 8 Drawing Sheets

(56) References Cited

U.S. PATENT DOCUMENTS

| | | | |
|---|---|---|---|
| 10,416,755 B1* | 9/2019 | Erivantcev | G06F 3/0346 |
| 2011/0273466 A1* | 11/2011 | Imai | G09G 3/003 |
| | | | 345/589 |
| 2012/0007884 A1* | 1/2012 | Kim | G10H 1/24 |
| | | | 345/633 |
| 2012/0105473 A1* | 5/2012 | Bar-Zeev | G06T 7/70 |
| | | | 345/633 |
| 2013/0278635 A1* | 10/2013 | Maggiore | G06F 3/0304 |
| | | | 345/633 |
| 2014/0152558 A1* | 6/2014 | Salter | G09G 5/377 |
| | | | 345/157 |
| 2014/0168261 A1* | 6/2014 | Margolis | A63F 13/65 |
| | | | 345/633 |
| 2015/0187136 A1* | 7/2015 | Grimaud | G06T 17/00 |
| | | | 345/420 |
| 2016/0180593 A1 | 6/2016 | Yang | |
| 2017/0193710 A1* | 7/2017 | Kumar | G06F 3/012 |
| 2017/0287456 A1* | 10/2017 | Zund | A63F 13/211 |
| 2019/0019335 A1* | 1/2019 | Elangovan | G06T 7/70 |
| 2019/0094389 A1* | 3/2019 | Li | G01S 19/48 |
| 2019/0108578 A1 | 4/2019 | Spivack et al. | |
| 2019/0208187 A1* | 7/2019 | Danziger | H04N 13/344 |
| 2020/0409511 A1* | 12/2020 | Cowburn | G06F 3/04842 |
| 2021/0374987 A1* | 12/2021 | Ma | G06N 3/08 |

FOREIGN PATENT DOCUMENTS

| | | |
|---|---|---|
| CN | 108022306 A | 5/2018 |
| CN | 109213728 A | 1/2019 |
| CN | 110738737 A | 1/2020 |
| JP | 2019087229 A | 6/2019 |
| JP | 2019153274 A | 9/2019 |
| KR | 20170054638 A | 5/2017 |
| KR | 20190008941 A | 1/2019 |
| WO | 2018039269 A1 | 3/2018 |
| WO | 2019161312 A1 | 8/2019 |
| WO | 2019177181 A1 | 9/2019 |

OTHER PUBLICATIONS

First Office Action of the Korean application No. 10-2020-7037428, dated Dec. 13, 2021, 12 pgs.
First Office Action of the Japanese application No. 2020-572865, dated Feb. 7, 2022, 10 pgs.

* cited by examiner

AUGMENTED REALITY SCENE IMAGE PROCESSING METHOD AND APPARATUS, ELECTRONIC DEVICE AND STORAGE MEDIUM

CROSS-REFERENCE TO RELATED APPLICATIONS

This is a continuation of International Patent Application No. PCT/CN2020/112707, filed on Aug. 31, 2020, which claims priority to Chinese Patent Application No. 201910979900.8, filed on Oct. 15, 2019. The contents of International Patent Application No. PCT/CN2020/112707 and Chinese Patent Application No. 201910979900.8 are hereby incorporated by reference in their entireties.

BACKGROUND

In an AR technology, physical information (visual information, a sound, a touch and the like) is simulated and then superimposed on the real world, and thus a real environment and a virtual object are presented in the same screen or space in real time. In recent years, AR devices have been widely used in more and more fields, so that the AR devices play an important role in life, work and recreation. Therefore, it has become increasingly important to optimize an effect of an AR scene presented by an AR device.

SUMMARY

The disclosure relates to the technical field of Augmented Reality (AR), and particularly to an AR scene image processing method and apparatus, an electronic device and a storage medium.

The technical solutions of the embodiments of the disclosure are implemented as follows.

The embodiments of the disclosure provide an AR scene image processing method, which may include that: shooting pose data of an AR device is acquired; presentation special effect data of a virtual object corresponding to the shooting pose data in a reality scene is acquired based on the shooting pose data and pose data of the virtual object in a three-dimensional scene model representing the reality scene; and an AR scene image is displayed through the AR device based on the presentation special effect information.

The embodiments of the disclosure provide an electronic device, which may include a processor, a memory and a bus. The memory is configured store machine-readable instructions executable by the processor. When the electronic device runs, the processor may communicate with the memory via the bus. The machine-readable instructions, when being executed by the processor, cause the processor to implement the steps of the method as described above.

The embodiments of the disclosure provide a computer-readable storage medium, in which a computer program may be stored, where the computer program, when being executed by a processor, causes the processor to implement the steps of the method as described above.

According to the following detailed descriptions made to exemplary embodiments with reference to the drawings, other features and aspects of the disclosure may become clear.

BRIEF DESCRIPTION OF THE DRAWINGS

For describing the technical solutions of the embodiments of the disclosure more clearly, the drawings required to be used in the embodiments will be simply introduced below. The drawings, which are incorporated in and constitute a part of this specification, illustrate embodiments consistent with the disclosure and, together with the specification, serve to explain the technical solutions of the disclosure. It is to be understood that the following drawings only illustrate some embodiments of the disclosure and thus should not be considered as limits to the scope. Those of ordinary skill in the art may also obtain other related drawings according to these drawings without creative work.

DETAILED DESCRIPTION

Figure 1:
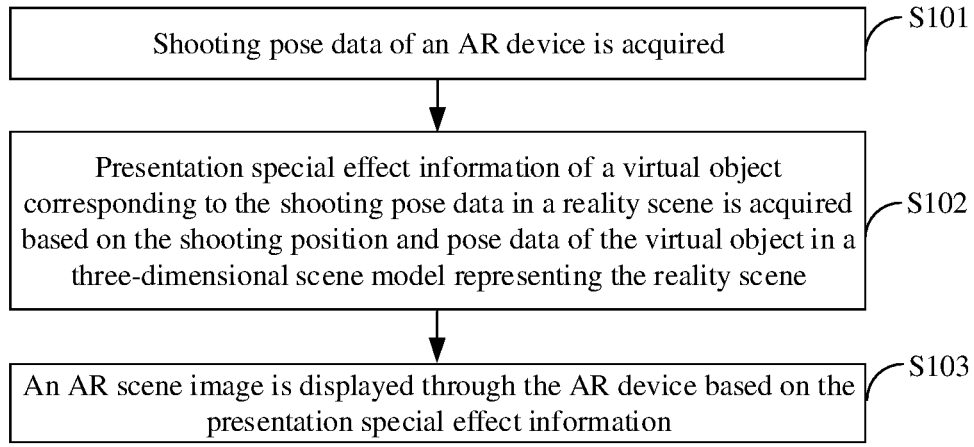
FIG. 1 is a flowchart of an AR scene image processing method according to an embodiment of the disclosure.

In order to make the purposes, technical solutions and advantages of the embodiments of the disclosure clearer, the technical solutions in the embodiments of the disclosure will be clearly and completely described below in combination with the drawings in the embodiments of the disclosure. It is apparent that the described embodiments are not all embodiments but only part of embodiments of the disclosure. Components, described and shown in the drawings, of the embodiments of the disclosure may usually be arranged and designed with various configurations. Therefore, the following detailed descriptions about the embodiments of the disclosure provided in the drawings are not intended to limit the claimed scope of the disclosure but only represent selected embodiments of the disclosure. All other embodiments obtained by those skilled in the art based the embodiments of the disclosure without creative work shall fall within the scope of protection of the disclosure.

The AR technology may be applied to an AR device. The AR device may be any electronic device capable of supporting an AR function, including, but not limited to, AR glasses, a tablet computer, a smart phone and the like. Under the condition that an AR device is operated in a reality scene, a virtual object superimposed on the reality scene may be viewed through the AR device. For example, a virtual tree superimposed on a real school playground and a virtual flying bird superimposed on the sky may be viewed. How to fuse virtual objects such as the virtual tree and the virtual flying bird to the reality scene better to achieve a presentation effect of the virtual object in an AR scene is to be discussed in the embodiments of the disclosure, and will be elaborated below in combination with the following embodiments.

For making the embodiments convenient to understand, an AR scene image processing method disclosed in the embodiments of the disclosure is introduced in detail at first. An execution entity of the AR scene image processing method provided in the embodiments of the disclosure may be the abovementioned AR device, or may also be another processing apparatus with a data processing capability, for example, a local or cloud server, which is not limited in the embodiments of the disclosure.

Referring to FIG. 1, FIG. 1 illustrates a flowchart of an AR scene image processing method according to an embodiment of the disclosure, which includes the following operations S101 to S103.

In S101, shooting pose data of an AR device is acquired.

In some examples, the AR device may include, but not limited to, a device with a display function and a data processing capability, such as AR glasses, a tablet computer, a smart phone and an intelligent wearable device.

In some examples, the shooting pose data of the AR device may include a position and/or display orientation of a display component configured to display a virtual object when a user holds or wears the AR device. For conveniently explaining the shooting pose data, a concept of coordinate system, for example, world coordinate system, is introduced. The shooting pose data includes a coordinate position of the display component of the AR device in the world coordinate system, or includes an included angle between the display component of the AR device and each coordinate axis in the world coordinate system, or includes both the coordinate position of the display component of the AR device in the world coordinate system and the included angle with each coordinate axis in the world coordinate system. The content included in the shooting pose data is related to a display manner set for the virtual object in an AR scene, and is not limited herein.

In S102, presentation special effect information of a virtual object corresponding to the shooting pose data is acquired in a reality scene based on the shooting pose data and pose data of the virtual object in a three-dimensional scene model representing the reality scene.

In some examples, the reality scene may be an indoor scene of a building, a street scene, or a reality scene where an object or others can superimpose a virtual object. The virtual object may be superimposed on the reality scene to present an AR effect in the AR device.

The three-dimensional scene model is configured to represent the reality scene, and is presented relative to the reality scene in equal proportion in the same coordinate system. For example, if the reality scene is a scene of a street, under the condition that the street includes a tall building, the three-dimensional scene model representing the reality scene also includes a model of the street and the tall building in the street, and the three-dimensional scene model and the reality scene are presented with in 1:1 proportion in the same coordinate system. That is, the three-dimensional scene model will completely overlap the reality scene under the condition that the three-dimensional scene model is put in the world coordinate system where the reality scene is located.

The virtual object is, for example, a virtual object presented in the reality scene, such as the virtual tree and virtual bird as mentioned above.

In some examples, the pose data of the virtual object in the three-dimensional scene model refers to position data, pose data, appearance data and the like of the virtual object when presented in the three-dimensional scene model, such as position data, pose data, appearance data of the abovementioned virtual bird when flying in the sky or the virtual tree when appearing on the playground.

Since the three-dimensional scene model and the reality scene are presented in 1:1 proportion in the same coordinate system and presented to in equal proportion in different coordinate systems, the pose data of the virtual object in the three-dimensional scene model is preset. As a result, the presentation special effect information of the virtual object in the reality scene can be represented according to the pose data.

For example, the three-dimensional scene model is a school playground, the virtual object is ten Christmas trees, and the presentation special effect information corresponding to the pose data is that the ten Christmas trees are presented at the northeast corner of the school playground. In some embodiments of the disclosure, the presentation special effect information of the ten Christmas trees in the reality scene may be determined according to the shooting pose data of the AR device and the coordinate position of the virtual object in the same coordinate system as the AR device in the reality scene. For example, under the condition that the AR device is close to the northeast corner of the school playground, since the view range of the AR device is limited, the acquired presentation special effect information of the ten Christmas trees corresponding to the shooting pose data in the reality scene may be that part of the ten Christmas trees, for example, the middle five Christmas trees, are presented at the northeast corner of the school playground.

In S103, an AR scene image is displayed through the AR device based on the presentation special effect information.

The AR scene image displayed through the AR device is a scene image formed after the presentation special effect information of the virtual object corresponding to the shooting pose data in the reality scene is superimposed on the reality scene. For example, for the abovementioned presentation special effect information of the virtual object corresponding to the shooting pose data in the reality scene is that five in the ten Christmas trees appear at the northeast corner of the school playground, in a case that the reality scene is the school playground, the AR scene image is a scene image that five in the ten Christmas trees are presented in the northeast corner of the school playground.

According to the AR scene image processing method disclosed in the above operations S101 to S103, the presentation special effect information of the virtual object in the reality scene is determined based on the preset pose data of the virtual object in the three-dimensional scene model representing the reality scene. Since the three-dimensional scene model may represent the reality scene, the pose data, constructed based on the three-dimensional scene model, of the virtual object may be fused to the reality scene better, and the presentation special effect information matched with the pose data of the AR device is determined from the pose data of the virtual object in the three-dimensional scene model, such that an effect of a realistic AR scene is displayed in the AR device.

When an execution entity of the above process is a processor deployed in the AR device, after the presentation special effect information of the virtual object corresponding to the shooting pose data is determined in the reality scene based on the above manner, the AR scene image may be directly displayed through the AR device. When the execution entity of the above process is a processor deployed in a cloud platform server, after the presentation special effect information of the virtual object corresponding to the shooting pose data in the reality scene is determined, the presentation special effect information may further be sent to the AR device side, and then the AR scene image is displayed through the AR device.

The process of S101 to S103 will be analyzed below in combination with embodiments.

For S101, the shooting pose data of the AR device may be acquired in multiple manners. For example, if the AR device is provided with a pose sensor, the shooting pose data of the AR device may be determined by the pose sensor on the AR device. If the AR device is provided with an image collection component such as a camera, the shooting pose data may be determined based on a reality scene image collected by the camera.

In some examples, the pose sensor may include an angular velocity sensor configured to determine a shooting orientation at which the AR device captures images of objects, such as a gyroscope and an Inertial Measurement Unit (IMU), or may include a positioning component configured to determine a shooting position of the AR device, such as a positioning component based on a Global Positioning System (GPS), a Global Navigation Satellite System (GNSS) and a Wireless Fidelity (WiFi) positioning technology, or may also include both the angular velocity sensor configured to determine the shooting orientation of the AR device and the positioning component configured to determine the shooting position.

In the embodiments of the disclosure, how to acquire the shooting pose data of the AR device is described for example by determining the shooting pose data based on the reality scene image collected by the camera.

Figure 2:
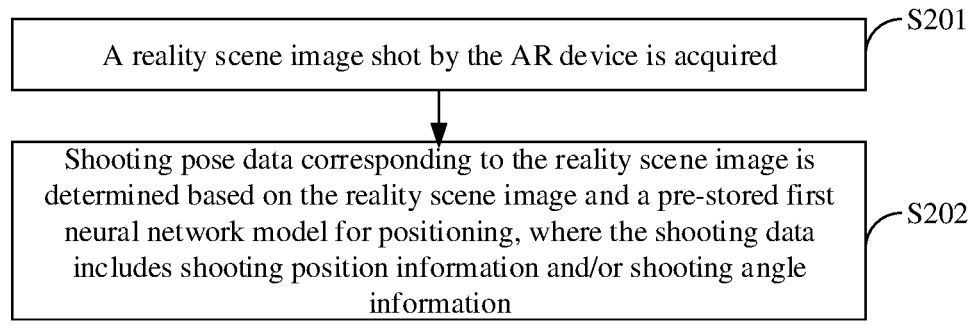
FIG. 2 is a flowchart of a method for determining shooting pose data according to an embodiment of the disclosure.

In an implementation mode, as shown in FIG. 2, in the operation that the shooting pose data is determined based on the reality scene image collected by the camera, the following operations S201 to S202 may be executed. In S201, a reality scene image shot by the AR device is acquired. In S202, shooting pose data corresponding to the reality scene image is determined based on the reality scene image and a pre-stored first neural network model for positioning, where the shooting pose data includes shooting position information and/or shooting orientation information.

In some examples, after the reality scene image collected by the camera of the AR device is acquired, the reality scene image may be input to the pre-trained first neural network model for positioning to obtain the shooting pose data corresponding to the reality scene image.

The shooting pose data may include a shooting position of the camera or shooting orientation information of the camera, or includes both the shooting position and shooting orientation information of the camera.

The first neural network model may be trained according to the following step. The first neural network model is trained based on multiple sample images obtained by shooting the reality scene in advance and shooting pose data corresponding to each of the multiple sample images.

For example, multiple different positions may be preset in the reality scene, then the reality scene is shot in each position at different shooting orientations to obtain a large number of sample images and shooting pose data corresponding to each sample image. The sample images, as input of the model, and the shooting pose data corresponding to the sample images, as output of the model, are input to a first neural network model to train the first neural network model. After a preset condition is reached, a trained first neural network model is obtained.

In some examples, the preset condition may include that a training count reaches a set threshold, or may also include that the recognition accuracy of the shooting pose data reaches a set accuracy range, which will not be elaborated herein.

Determination of the shooting pose data based on the reality scene image collected by the camera is implemented based on a deep learning manner Under the condition that enough sample images are obtained by shooting the reality scene in advance, a relatively high-accuracy first neural network model configured to recognize the high shooting pose data may be obtained. By means of the first neural network model, relatively high-accuracy shooting pose data corresponding to the reality scene image can be determined based on the reality scene image shot by the AR device.

Figure 3:
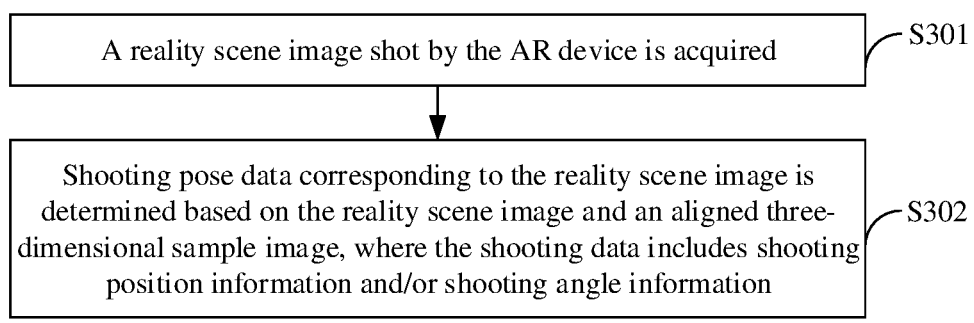
FIG. 3 is a flowchart of another method for determining shooting pose data according to an embodiment of the disclosure.

In another implementation mode, as shown in FIG. 3, in the operation that the shooting pose data is determined based on the reality scene image collected by the camera, the following operations S301 to S302 may be executed. In S301, a reality scene image shot by the AR device is acquired. In S302, shooting pose data corresponding to the reality scene image is determined based on the reality scene image and an aligned three-dimensional sample image, where the shooting pose data includes shooting position information and/or shooting orientation information.

The aligned three-dimensional sample image is a three-dimensional sample image obtained after feature point alignment of a sample image library obtained by shooting the reality scene in advance with a pre-stored three-dimensional sample image. The pre-stored three-dimensional sample image is a three-dimensional image pre-stored and representing a morphology feature of the reality scene.

In some examples, the pre-stored three-dimensional sample image may include a preset three-dimensional image capable of representing the morphology feature of the reality scene and with dimension mark, for example, a Computer Aided Design (CAD) three-dimensional image for representing the morphology feature of the reality scene. For example, three-dimensional images representing morphology features of various reality scenes may be drawn in advance in CAD software, and then the three-dimensional images are stored in association with their corresponding reality scenes.

The aligned three-dimensional sample image may be obtained according to the following steps.

The reality scene is photographed according to different shooting pose data to obtain multiple sample images to form a sample image library. For each sample image, multiple feature points are extracted to form a feature point cloud representing the reality scene. The feature point cloud is aligned with the pre-stored three-dimensional image representing the morphology feature of the reality scene to obtain the aligned three-dimensional sample image.

In some examples, the feature points extracted for each sample image may be points representing key information of the reality scene. For example, for a face image, the feature points may include some feature points representing information of facial features, such as feature points of the canthi, the corners of the mouth, the eyebrows and the wings of the nose.

Under the condition that enough feature points are extracted, the feature point cloud formed by the feature points may form a three-dimensional model representing the reality scene. Here, the feature point in the feature point cloud has no unit, and the three-dimensional model formed by the feature point cloud also has no unit. Then, the feature point cloud is aligned with the three-dimensional image with dimension mark and representing the morphology feature of the reality scene to obtain the aligned three-dimensional sample image. Since the three-dimensional image representing the morphology feature of the reality scene is a three-dimensional image with the dimension mark, for example, the dimension mark may be a pixel coordinate in a pixel coordinate system, and thus coordinate information, corresponding to the feature points extracted from each sample image, in the aligned three-dimensional sample image may be determined based on the aligned three-dimensional sample image.

The sample image library obtained by shooting the reality scene may include the shooting pose data corresponding to each sample image. Therefore, under the condition that the reality scene image shot by the AR device is acquired, feature points in the reality scene image may be extracted, the sample image matched with the reality scene image is determined based on the aligned three-dimensional sample image, and the shooting pose data corresponding to the reality scene image is determined based on the shooting pose data corresponding to the sample image in the sample image library.

Figure 4:
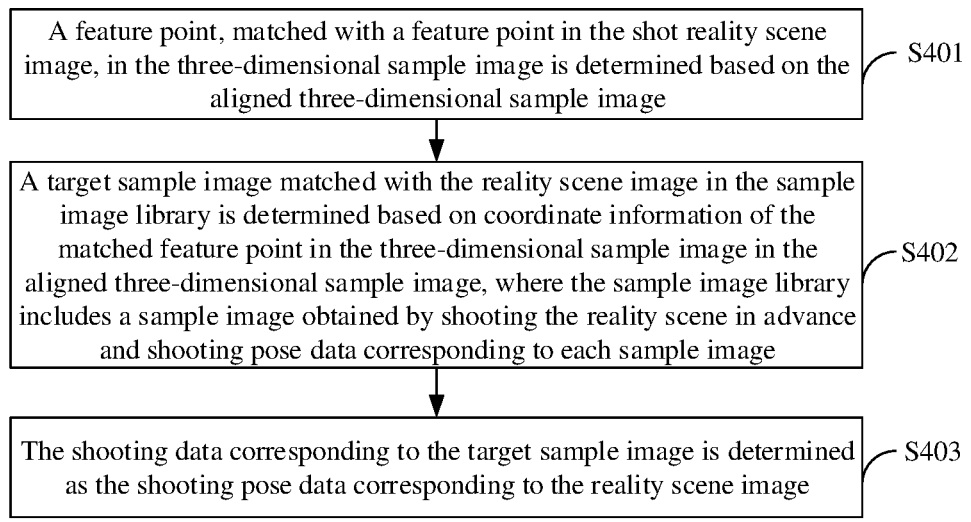
FIG. 4 is a flowchart of another method for determining shooting pose data according to an embodiment of the disclosure.

As shown in FIG. 4, in the operation that the shooting pose data corresponding to the reality scene image is determined based on the reality scene image and the aligned three-dimensional sample image, the following operations S401 to S403 may be executed. In S401, a feature point matched with a feature point in the shot reality scene image is determined in the three-dimensional sample image based on the aligned three-dimensional sample image. In S402, a target sample image matched with the reality scene image is determined in the sample image library based on coordinate information of the matched feature point in the three-dimensional sample image, located in the aligned three-dimensional sample image, where the sample image library includes a sample image obtained by shooting the reality scene in advance and shooting pose data corresponding to each sample image. In S403, the shooting pose data corresponding to the target sample image is determined as the shooting pose data corresponding to the reality scene image.

After the reality scene image shot by the AR device is acquired, the feature point in the reality scene image is extracted, then the feature point in the reality scene image is aligned with the aligned three-dimensional sample image to obtain in the aligned three-dimensional sample image a feature point, matched with the feature point in the reality scene image, in the three-dimensional sample image, and the coordinate information of the matched feature point in the three-dimensional sample image in the aligned three-dimensional sample image is determined as coordinate information of the feature point in the reality scene image. In such a manner, the target sample image matched with the reality scene image may be determined in the sample image library based on the coordinate information of the feature point of the reality scene image and feature information of a feature point in each sample image of the sample image library. For example, a similarity value between the reality scene image and each sample image may be determined based on the coordinate information of the feature point in the reality scene image and the feature information of the feature point of each sample image, and the sample image of which the similarity value is maximum and exceeds a similarity threshold is determined as the target sample image.

After the target sample image is determined, the shooting pose data corresponding to the target sample image is determined as the shooting pose data corresponding to the reality scene image.

According to the embodiment of the disclosure, the three-dimensional sample image, obtained after feature point alignment of the sample image library obtained by shooting the reality scene in advance with the pre-stored three-dimensional sample image, is constructed in advance. Therefore, under the condition that the reality scene image is acquired, the target sample image matched with the reality scene image may be accurately determined in the sample image library according to the feature point in the reality scene image and the aligned three-dimensional sample image, and then the shooting pose data corresponding to the target sample image may be determined as the shooting pose data corresponding to the reality scene image.

The above describes several manners for acquiring the shooting pose data of the AR device. After the shooting pose data of the AR device is acquired, in some embodiments of the disclosure, the presentation special effect information of the virtual object corresponding to the shooting pose data in the reality scene may be acquired based on the shooting pose data and pose data of the virtual object in the three-dimensional scene model representing the reality scene.

For S102, the three-dimensional scene model has been described above, and has the following two functions. One is to obtain presentation special effect information of the virtual object in the reality scene so as to obtain the pose data of the virtual object in the three-dimensional scene model. The other is to present an occlusion effect under the condition that the virtual object is presented in the reality scene. For example, under the condition of determining that the presentation special effect information of the virtual object in the reality scene is that the virtual object is occluded by a physical object in the reality scene, based on coordinates of the virtual object, the AR device and the reality scene in the coordinate system where the AR device is located, the occlusion effect may be presented through the three-dimensional scene model. The occlusion effect will be described hereinafter, and a generation process of the three-dimensional scene model is introduced herein at first.

The three-dimensional scene model is generated according to the following steps. Multiple reality scene images corresponding to the reality scene are acquired, and the three-dimensional scene model is generated based on the multiple reality scene images.

Under the condition that the multiple reality scene images corresponding to the reality scene are acquired, in order to obtain a three-dimensional scene model accurately representing the reality scene, during acquiring the multiple reality scene images corresponding to the reality scene, the reality scene may be shot in multiple preset positions in the reality scene at different shooting orientations. For example, the reality scene may be shot by a Red Green Blue Depth (RGB-D) camera to obtain a large number of reality scene images that can comprehensively represent a view of the reality scene. Then, the three-dimensional scene model is generated based on the large number of reality scene images.

In the operation that the three-dimensional scene model is generated based on the multiple reality scene images, the following process may be included. Multiple feature points are extracted from each reality scene image in the acquired multiple reality scene images; and the three-dimensional scene model is generated based on the extracted multiple feature points and a pre-stored three-dimensional sample image matched with the reality scene. The three-dimensional sample image is a pre-stored three-dimensional image representing the morphology feature of the reality scene.

For obtaining a high-accuracy three-dimensional scene model, multiple feature points may be extracted from each reality scene image in the acquired multiple reality scene images to, for example, form a dense point cloud representing the morphology of the reality scene, and then the three-dimensional scene model is generated based on the dense point cloud and the pre-stored three-dimensional sample image matched with the reality scene. The three-dimensional sample image matched with the reality scene is described above and will not be elaborated herein.

In the process of generating the three-dimensional scene model, the dense point cloud representing the reality scene may be aligned with the three-dimensional sample image to obtain the aligned three-dimensional sample image corresponding to the reality scene, thereby obtaining the three-dimensional model representing the reality scene and first coordinate information of the three-dimensional model in the aligned three-dimensional sample image. The second coordinate information of the three-dimensional model in a unity coordinate system is determined according to the first coordinate information of the three-dimensional model in the aligned three-dimensional sample image and a transformation relationship between a pixel coordinate system in the aligned three-dimensional sample image and the unity coordinate system. In some embodiments of the disclosure, the third coordinate information of the three-dimensional model in the world coordinate system is determined according to the second coordinate information of the three-dimensional model in the unity coordinate system and a transformation relationship between the unity coordinate system and the world coordinate system, thereby obtaining the three-dimensional scene model. Here, the dense point cloud representing the reality scene is transformed in equal proportion during transformation in multiple coordinate systems, and the obtained three-dimensional scene model and the reality scene are presented in 1:1 proportion when appearing in the same coordinate system, namely the three-dimensional scene model will completely overlap the reality scene.

According to the embodiment of the disclosure, a dense point cloud is formed by multiple feature points in each reality scene image of the multiple reality scene images, a three-dimensional model representing the reality scene is generated based on the dense point cloud and the three-dimensional sample image with dimension mark, and the three-dimensional scene model representing the reality scene is obtained based on equal-proportion coordinate transformation. In this way, the obtained three-dimensional scene model can accurately represent the reality scene.

For representing a presentation special effect of the virtual object when the virtual object is occluded by the physical object in the reality scene, the three-dimensional scene model is required when the presentation special effect information of the virtual object corresponding to the shooting pose data in the reality scene is acquired. That is, the operation that the presentation special effect information of the virtual object corresponding to the shooting pose data in the reality scene is acquired based on the acquired shooting pose data and the pose data of the virtual object in the three-dimensional scene model representing the reality scene may include that: the presentation special effect information of the virtual object corresponding to the shooting pose data is acquired based on the acquired shooting pose data, the pose data of the virtual object in the three-dimensional scene model, and the three-dimensional scene model.

Under the condition that the three-dimensional scene model and the AR device are in the same coordinate system, whether the virtual object is occluded by any physical object in the reality scene corresponding to the three-dimensional scene model may be determined according to position coordinates of the three-dimensional scene model, the shooting pose data of the AR device and the pose data of the virtual object in the three-dimensional scene model. When determining that a partial region of the virtual object is occluded by a physical object in the reality scene corresponding to the three-dimensional scene model, the occluded partial region will not be rendered, and the three-dimensional scene model may be processed to be a transparent state in its represented reality scene. That is, the user will not view the transparent three-dimensional scene model in the AR device, but view a presentation effect that the virtual object is occluded by the physical object in the reality scene.

Figure 5:
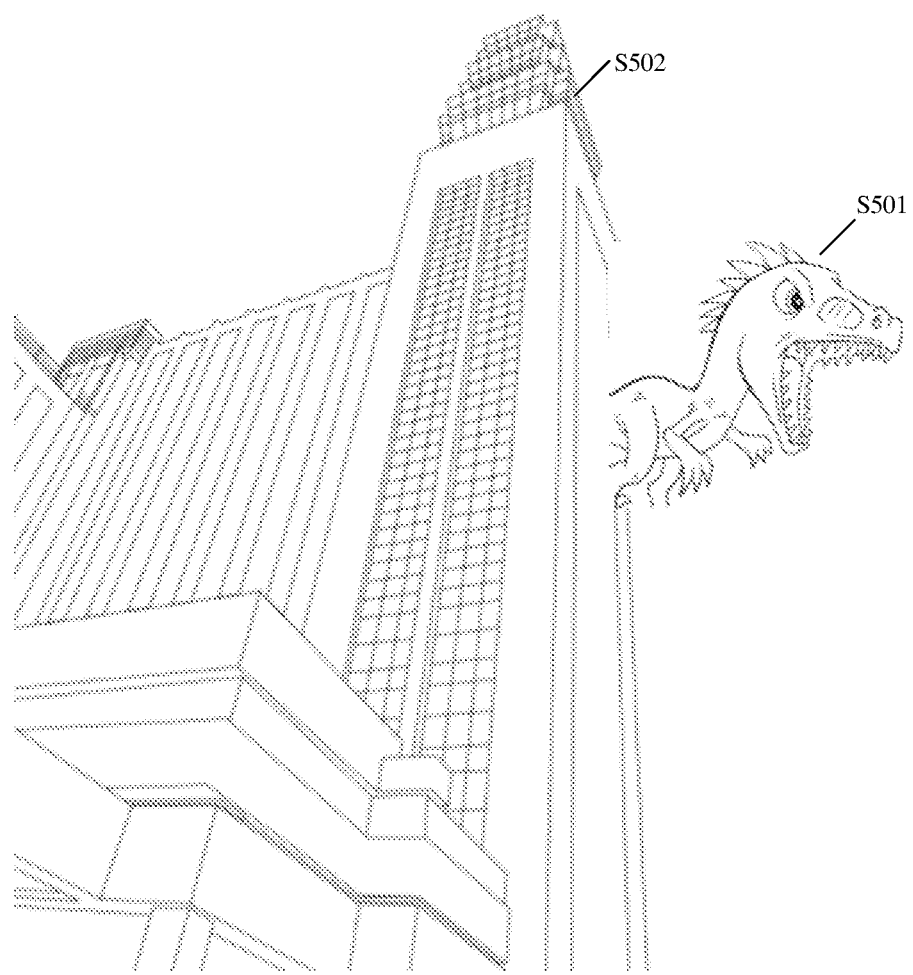
FIG. 5 is a graph showing the effect of AR according to an embodiment of the disclosure.

FIG. 5 shows an AR scene. In FIG. 5, a virtual object S501 is a virtual dinosaur, and a reality scene S502 is a building. A building image displayed in FIG. 5 is a three-dimensional scene model corresponding to the reality scene. Under the condition of determining, based on a position coordinate of the three-dimensional scene model, shooting position data of the AR device and pose data of the virtual dinosaur in the three-dimensional scene model, that the virtual dinosaur is occluded by a physical object (i.e., the building) in the reality scene corresponding to the three-dimensional scene model, the occluded part of the virtual dinosaur will not be rendered, and the three-dimensional scene model may be in a transparent state during the rendering process. As a result, an AR user may view a realistic occlusion effect through the AR device. That is, a presentation special effect that the virtual dinosaur comes out from rear of the building can be displayed in a case that a partial region of the virtual dinosaur is occluded by the building.

According to the embodiment, the shooting pose data of the AR device, the pose data of the virtual object in the three-dimensional scene model, and the three-dimensional scene model are combined to determine the presentation special effect information of the virtual object in the reality scene. Therefore, under the condition of determining that the virtual object is occluded by a physical object in the reality scene corresponding to the three-dimensional scene model, an occlusion effect of the virtual object can be implemented through the three-dimensional scene model, so as to display a more realistic AR scene in the AR device.

In an implementation mode, after the AR scene image is displayed through the AR device based on the presentation special effect information, the AR scene image processing method provided in the embodiment of the disclosure further includes that: a triggering operation for the virtual object displayed in the AR device is acquired, and the presentation special effect information presented in the AR scene image is updated.

In some examples, updating the presentation special effect information presented in the AR scene image may refer to triggering updating of a picture of the virtual object in the AR scene, triggering updating of a sound playing effect corresponding to the virtual object, or triggering updating of smell diffusion corresponding to the virtual object, or triggering multiple combinations of updating of the picture of the virtual object in the AR scene, updating of the sound playing effect corresponding to the virtual object, or updating of smell diffusion corresponding to the virtual object.

The triggering operation for the virtual object displayed in the AR device may be implemented by triggering through a gestural action of the user. For example, a specific gestural action represents a triggering operation for the virtual object displayed in the AR device. For example, leftward and rightward sliding with a finger may represent switching of the virtual object, and such triggering operation may be applied to an AR device with an image collection component. The triggering operation for the virtual object displayed in the AR device may also be implemented by triggering through a virtual button set on a display screen, and such triggering operation is mainly applied to an AR device with a display component.

In the embodiment of the disclosure, the virtual object includes, for example, a target musical instrument, such as a virtual piano and a virtual chime, etc. The operation that the triggering operation for the virtual object displayed in the AR device is acquired and the presentation special effect information presented in the AR scene image is updated may include the following operation.

The triggering operation for the virtual object displayed in the AR device is acquired, and the AR device is controlled to update a sound playing effect of the virtual object to a sound playing effect corresponding to the triggering operation.

For example, under the condition that the target musical instrument is a virtual chime and a triggering operation for the virtual chime displayed in the AR device is acquired, a sound may be played according to a corresponding sound playing effect of the virtual chime after being triggered.

As another example, the virtual object includes a target musical instrument. In condition that there are multiple AR devices, multiple AR users may interact with the virtual object in AR scene images displayed in the AR devices. The operation that the triggering operation for the virtual object displayed in the AR device is acquired and the presentation special effect information in the AR scene image is updated may include the following operations.

(1) Triggering operations for the same virtual object displayed in the multiple AR devices are acquired, and the multiple AR devices are controlled to update a sound playing effect of the same virtual object to a mixed sound playing effect corresponding to the multiple triggering operations for the same virtual object; or, (2) a triggering operation for at least one virtual object displayed in at least one AR device of the multiple AR devices is acquired, and the at least one AR device is controlled to update a sound playing effect of the at least one virtual object to a mixed sound playing effect corresponding to the triggering operation for the at least one virtual object.

For example, under the condition that triggering operations of the multiple AR users for the same virtual piano displayed in the respective AR devices, a sound may be played according to a corresponding mixed sound playing effect after the virtual piano displayed in the multiple AR devices is triggered; or, when triggering operations of the multiple AR users for different virtual chimes displayed in the respective AR devices, the sound may be played according to a corresponding mixed sound playing effect of the different virtual chimes after being triggered.

According to the embodiment of the disclosure, under the condition that the triggering operation for the virtual object displayed in the AR device is acquired, the presentation special effect information presented in the AR scene image may be updated, so that the operability of the AR scene is improved, thereby improving user experiences.

Figure 6:
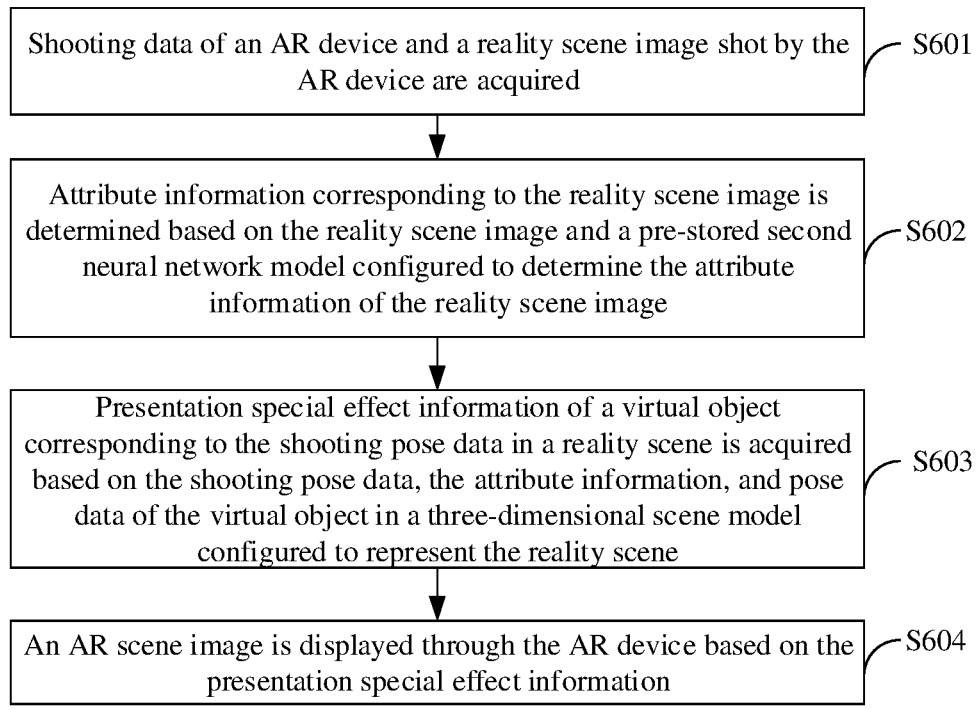
FIG. 6 is a flowchart of another AR scene image processing method according to an embodiment of the disclosure.

Referring to FIG. 6, embodiments of the disclosure also provide another AR scene image processing method, which may include the following operations S601 to S603.

In S601, shooting pose data of an AR device and a reality scene image shot by the AR device are acquired.

The shooting pose data is the same as that described above and will not be elaborated herein.

In S602, attribute information corresponding to the reality scene image is determined based on the reality scene image and a pre-stored second neural network model configured to determine the attribute information of the reality scene image.

In some examples, the attribute information refers to a specific type of a reality scene represented by the reality scene image, and may be represented by a tag identification. For example, the same indoor space may be decorated to multiple decoration types, and each decoration type may correspond to a presentation special effect of a virtual object. For example, the virtual object may be virtual ceiling lamps that emit light with different colors. Attribute information corresponding to the indoor space may include a European style, a Chinese style and an American style. The virtual object corresponding to the European style is the ceiling lamp emitting light with a first color, the virtual object corresponding to the Chinese style is the ceiling lamp emitting light with a second color, and the virtual object corresponding to the American style is the ceiling lamp emitting light with a third color.

In S603, presentation special effect information of a virtual object corresponding to the shooting pose data in a reality scene is acquired based on the shooting pose data, the attribute information, and pose data of the virtual object in a three-dimensional scene model representing the reality scene.

In S604, an AR scene image is displayed through the AR device based on the presentation special effect information.

The operations S602 to S603 are described below.

For the operation in S602, the second neural network model may be trained according to the following step.

The second neural network model is trained based on multiple sample images obtained by shooting the reality scene in advance and attribute information corresponding to each sample image.

In some examples, for each reality scene, the reality scene may be shot according to different shooting poses to obtain a large number of sample images and attribute information corresponding to each sample image. The sample images, as input of the model, and the attribute information corresponding to the sample images, as output of the model, are input to a second neural network model for training. After a preset condition is reached, a trained second neural network model is obtained.

In some examples, the preset condition may be that a training count reaches a set threshold, or may also be that the recognition accuracy of shooting pose data reaches a set accuracy range, which will not be elaborated herein.

For the operation in S603, the attribute information of the reality scene is added on the basis of the above operation in S102, namely the presentation special effect information of the virtual object corresponding to the shooting pose data in the reality scene is acquired based on the shooting pose data, the attribute information and the pose data of the virtual object in the three-dimensional scene model representing the reality scene. For example, for the example as mentioned above, if the attribute information of the indoor space shot is the European style, then the virtual object is the ceiling lamp emitting light with the first color, and thus presentation special effect information corresponding to the indoor space of the European style may be obtained. If the attribute information of the indoor space shot is the Chinese style, then the virtual object is the ceiling lamp emitting light with the second color, and thus presentation special effect information corresponding to the indoor space of the Chinese style may be obtained.

The function of the shooting pose data for acquisition of the presentation special effect information is similar to that described above, and will not be elaborated herein.

The condition that the virtual object is occluded by a physical object in the reality scene when presented is similar to the condition described above, and will not be elaborated herein.

According to the implementation mode, the shooting pose data of the AR device and the attribute information of the reality scene image are combined to determine the presentation special effect information of the virtual object in the reality scene, so that a presentation special effect of the virtual object can be better fused to the reality scene.

In addition, embodiments of the disclosure also provide an AR scene image processing method. In the method, a preset identifier may be added to the reality scene, and the preset identifier stores preset identification information mapped with additional virtual object information. Here, the additional virtual object information may be information associated with the reality scene, such as an animation, a text and a picture. The method includes the following operations that: shooting pose data of an AR device and a preset identifier of a reality scene shot by the AR device are acquired; additional virtual object information corresponding to the reality scene is determined based on the preset identifier and a pre-stored mapping relationship between preset identifiers and additional virtual object information; presentation special effect information of a virtual object corresponding to the shooting pose data in the reality scene is acquired based on the shooting pose data, the additional virtual object information, and pose data of the virtual object in a three-dimensional scene model representing the reality scene; and an AR scene image is displayed through the AR device based on the presentation special effect information.

For example, a flower vase in the reality scene may be attached with a preset identifier, and the preset identifier may be a two-dimensional code, an image tag and the like. After the preset identifier shot by the AR device is acquired, preset identification information stored in the preset identifier may be extracted, it may be determined, based on the preset identification information and a pre-stored mapping relationship between preset identification information and additional virtual object information, that additional virtual object information may be presented in the AR device after the preset identifier on the vase is scanned. Then, presentation special effect information of a virtual object corresponding to shooting pose data in the reality scene is acquired based on the shooting pose data of the AR device, pose data of the virtual object in the three-dimensional scene model representing the reality scene, and the additional virtual object information corresponding to the preset identification information. An AR scene image is displayed through the AR device based on the presentation special effect information. The function of the shooting pose data for acquisition of the presentation special effect information is similar to that described above, and will not be elaborated herein.

For example, the additional virtual object information is a text introduction to a vase in the indoor space, a two-dimensional code is adhered to the vase, preset identification information corresponding to the additional virtual object information is stored in the two-dimensional code, and a virtual object corresponding to shooting pose data of an AR device entering the indoor space is a virtual presenter. After the AR device scans the two-dimensional code adhered to the vase to acquire the preset identification information, presentation special effect information obtained may be that the virtual presenter explains the additional virtual object information, i.e., the text introduction to the vase, beside the vase.

According to the implementation mode, the shooting pose data of the AR device and the additional virtual object information corresponding to the preset identifier of the reality scene are combined to determine the presentation special effect information of the AR scene image, so that the AR scene image can be displayed in more manners.

In addition, in the operation that the AR scene image is displayed through the AR device based on the presentation special effect information, according to the embodiments of the disclosure, when the AR device approaches a stable virtual object, a coordinate of the virtual object is regulated in real time to keep a coordinate system where the virtual object is located to be the same as a coordinate system where the AR device is located. In such a manner, an approaching effect when an AR user approaches the virtual object can be presented the same as that in the reality scene. For example, the AR user views a virtual vase placed on a real round table through the AR device, and the AR user, when approaching the virtual vase, may feel that a distance between him and the virtual vase is gradually shortened, i.e., a real approaching effect is presented.

Figure 7:
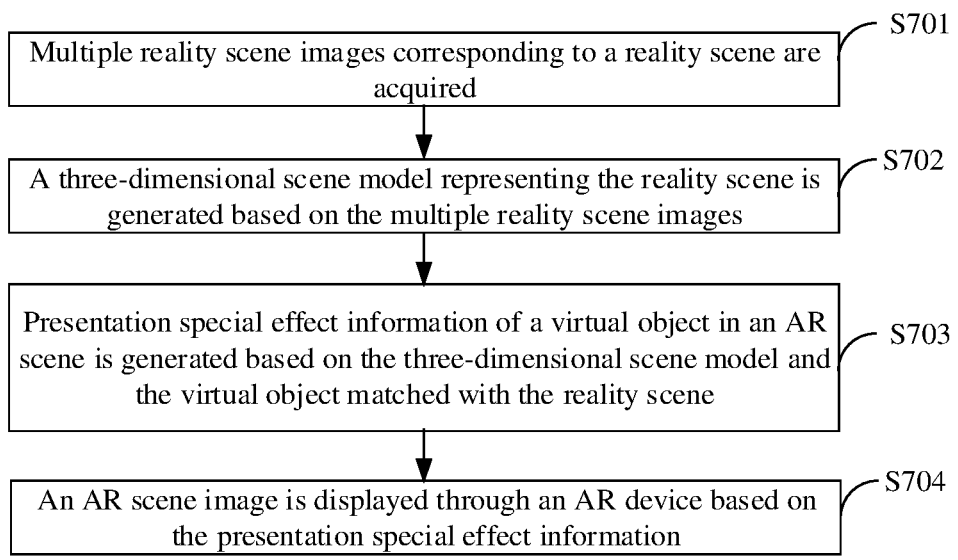
FIG. 7 is a flowchart of another AR scene image processing method according to an embodiment of the disclosure.

Referring to FIG. 7, embodiments of the disclosure also provide another AR scene image processing method, where an execution entity may be a processor deployed at a cloud platform server. The following operations S701 to S703 are included. In S701, multiple reality scene images corresponding to a reality scene are acquired. In S702, a three-dimensional scene model configured to represent the reality scene is generated based on the multiple reality scene images. In S703, presentation special effect information of a virtual object in an AR scene is generated based on the three-dimensional scene model and the virtual object matched with the reality scene. In S704, an AR scene image is displayed through an AR device based on the presentation special effect information.

A process of generating the three-dimensional scene model is the same as that mentioned above, and will not be elaborated herein.

Here, the pose data of the virtual object in the three-dimensional scene model may be set, namely the presentation special effect information of the virtual object in the three-dimensional scene model may be obtained. Since the three-dimensional scene model completely overlaps the reality scene it represents in the same coordinate system, the presentation special effect information of the virtual object in an AR scene can be obtained according to the pose data of the virtual object in the three-dimensional scene model.

According to the embodiments of the disclosure, the three-dimensional scene model representing the reality scene may be obtained, for example, a three-dimensional scene model presented relative to the reality scene according to 1:1 proportion in the same coordinate system is obtained, based on the multiple reality scene images corresponding to the reality scene. In this way, the presentation special effect information of the virtual object in the AR scene may be determined in advance based on the three-dimensional scene model and the virtual object matched with the virtual object, and thus an effect of a realistic AR scene can be displayed in the AR device under the condition that the virtual object is presented in the 1:1 proportional reality scene according to the presentation special effect information.

Figure 8:
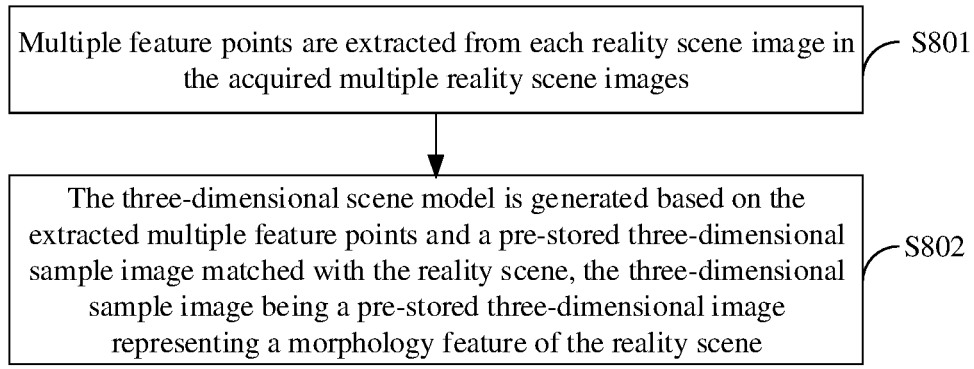
FIG. 8 is a flowchart of a method for generating a three-dimensional scene model according to an embodiment of the disclosure.

As shown in FIG. 8, in the operation that the three-dimensional scene model representing the reality scene is generated based on the multiple reality scene images, the following operations S801 to S802 may be executed. In S801, multiple feature points are extracted from each reality scene image in the acquired multiple reality scene images. In S802, the three-dimensional scene model is generated based on the extracted multiple feature points and a pre-stored three-dimensional sample image matched with the reality scene, where the three-dimensional sample image includes a pre-stored three-dimensional image representing a morphology feature of the reality scene.

The process is a process of generating the three-dimensional scene model representing the reality scene based on the multiple reality scene images, which has been described above in detail and will not be elaborated herein.

According to the embodiments of the disclosure, the multiple feature points in each of the multiple reality scene images form a dense point cloud, a three-dimensional model representing the reality scene is generated based on the dense point cloud and the three-dimensional sample image with dimension mark, and the three-dimensional scene model representing the reality scene is obtained based on equal-proportion coordinate transformation. In this way, the obtained three-dimensional scene model can accurately represent the reality scene.

Figure 9:
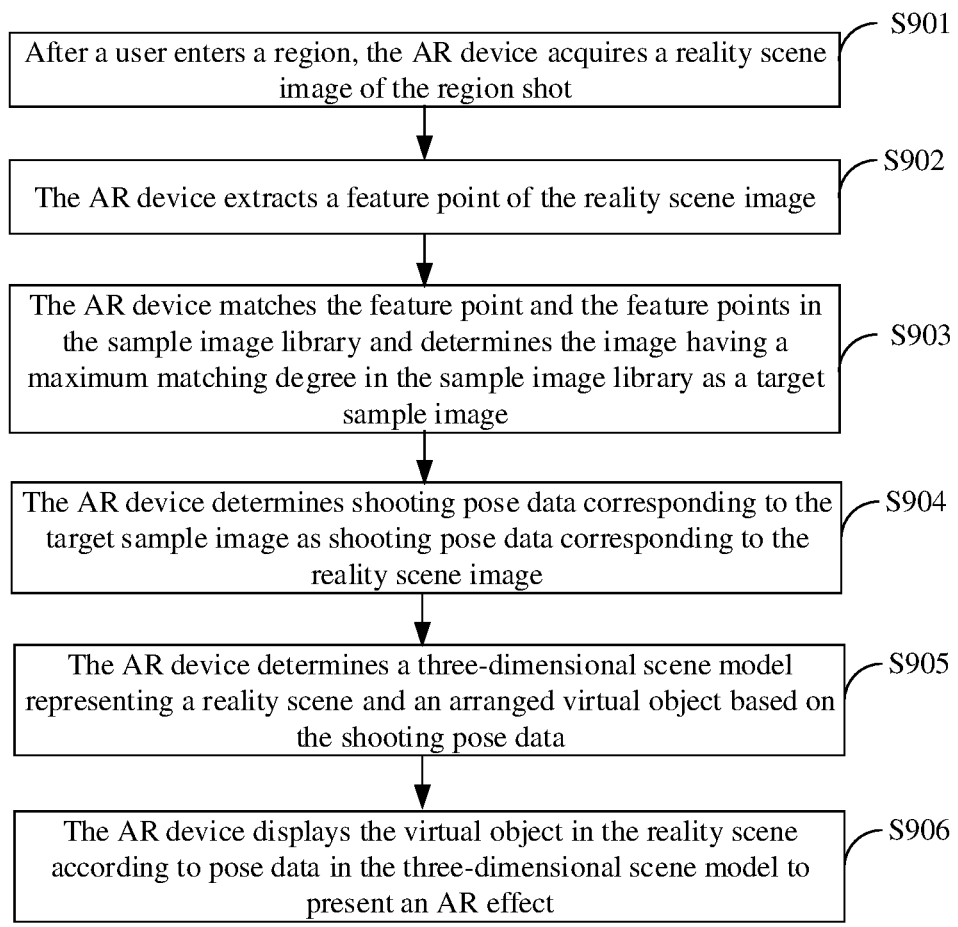
FIG. 9 is a flowchart of an AR scene image processing method according to an embodiment of the disclosure.

FIG. 9 is a flowchart of an AR scene image processing method according to embodiments of the disclosure. The execution entity of the AR scene image processing method provided in the embodiments of the disclosure may be the abovementioned AR device, or may also be another processing apparatus with a data processing capability, for example, a local or cloud server. Descriptions will be made by taking the execution entity of the AR scene image processing method being the AR device as an example. As shown in FIG. 9, the AR scene image processing method may include the following operations S901 to S906.

In S901, after a user enters a region, the AR device acquires a reality scene image of the region shot.

A sample image library positioned may be determined based on a Structure-From-Motion (SFM) algorithm for three-dimensional reconstruction, and construction of the sample image library may include the following operations.

The AR device collects a large number of images at different orientations, and extracts feature points of each image in a three-dimensional object to form a three-dimensional model formed by SFM point clouds.

The AR device aligns the SFM point clouds and a CAD sample image (where a standard CAD sample image is selected based on collected feature point data) to obtain the sample image library.

In S902, the AR device extracts a feature point of the reality scene image.

In S903, the AR device matches the feature point and the feature points in the sample image library and determines the image having a maximum matching degree in the sample image library as a target sample image.

In S904, the AR device determines shooting pose data corresponding to the target sample image as shooting pose data corresponding to the reality scene image.

The shooting pose data may be current position information of the AR device, and the current position information may be a geographical coordinate and/or a shooting orientation.

In S905, the AR device determines a three-dimensional scene model representing a reality scene and an arranged virtual object based on the shooting pose data.

The three-dimensional scene model may be constructed by a dense reconstruction method, which may include operations.

The AR device extracts multiple feature points in a large number of images.

The AR device connects each feature point to obtain a plane of the model, the plane of the model forming the three-dimensional scene model.

In addition, the three-dimensional scene model may be constructed by another construction method, which may include operation S9053.

The AR device constructs a large number of three-dimensional scene models corresponding to the reality scene based on three-dimensional or two-dimensional images of the reality scene.

Based on the constructed three-dimensional scene model, the virtual object may be arranged in a scene corresponding to the scene model. The three-dimensional scene model, the arranged virtual object and the geographical position information (a position, i.e., the shooting pose data, of the VR device) are stored for subsequent use.

In S906, the AR device displays the virtual object in the reality scene according to pose data in the three-dimensional scene model to present an AR effect.

The pose data may be a position relationship of the virtual object deployed in the three-dimensional scene model.

Figure 10:
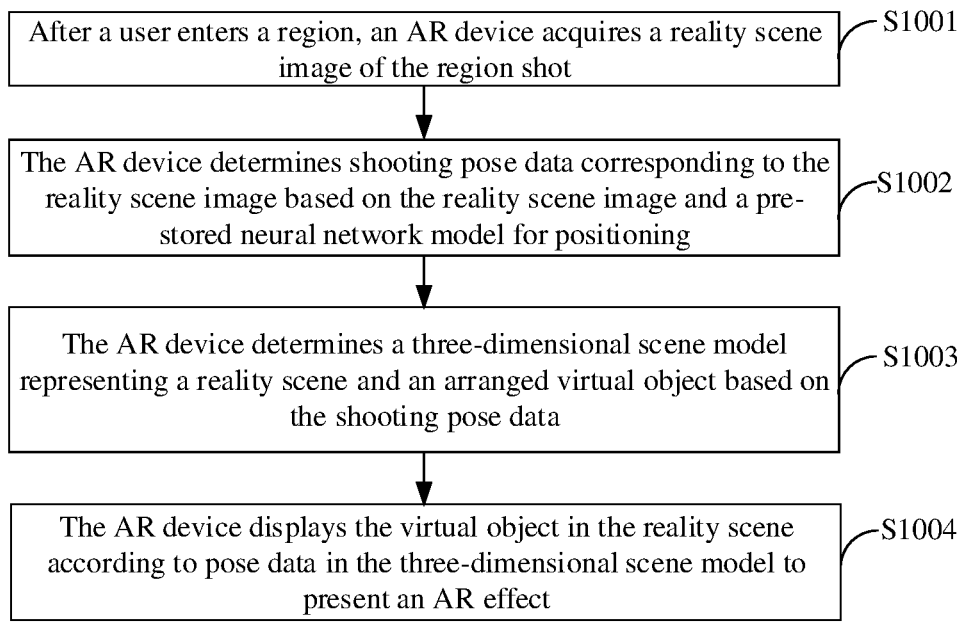
FIG. 10 is a flowchart of another AR scene image processing method according to an embodiment of the disclosure.

FIG. 10 is a flowchart of another AR scene image processing method according to embodiments of the disclosure. As shown in FIG. 10, the AR scene image processing method may include the following operations S1001 to S1004.

In S1001, after a user enters a region, an AR device acquires a reality scene image of the region shot.

In S1002, the AR device determines shooting pose data corresponding to the reality scene image based on the reality scene image and a pre-stored neural network model for positioning. The shooting pose data includes shooting position and/or shooting orientation information.

Training of a neural network may include the following operations.

A large number of image position samples are preset, and images and positions, as model input and model output respectively, are input to a neural network model for training to obtain a position prediction model.

After an image is acquired, the image is input to the position prediction model to determine a position (i.e., shooting pose data) corresponding to the image.

In S1003, the AR device determines a three-dimensional scene model representing a reality scene and an arranged virtual object based on the shooting pose data.

In S1004, the AR device displays the virtual object in the reality scene according to pose data in the three-dimensional scene model to present an AR effect.

The process in the AR scene image processing method may also be implemented in combination with region recognition, object attribute recognition, route planning for a virtual object and the like.

Based on the same technical concept, embodiments of the disclosure also provide an AR scene image processing apparatus corresponding to the AR scene image processing method. Because the principles for solving these problems by these devices in the embodiments of the disclosure are the same as the principles of the foregoing AR scene image processing method, implementation of these devices may refer to the implementation of the foregoing methods and repeated descriptions will not be elaborated.

Figure 11:
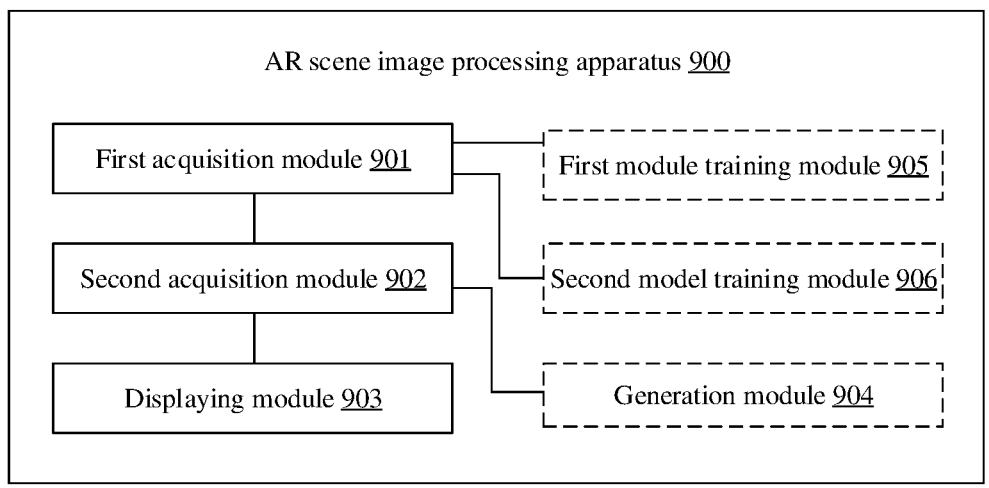
FIG. 11 is a schematic structure diagram of an AR scene image processing apparatus according to an embodiment of the disclosure.

As shown in FIG. 11, an AR scene image processing apparatus 900 provided in an embodiment of the disclosure includes a first acquisition module 901, a second acquisition module 902 and a displaying module 903.

The first acquisition module 901 is configured to acquire shooting pose data of an AR device. The second acquisition module 902 is configured to acquire presentation special effect data of a virtual object corresponding to the shooting pose data in a reality scene based on the shooting pose data and pose data of the virtual object in a three-dimensional scene model representing the reality scene. The displaying module 903 is configured to display an AR scene image through the AR device based on the presentation special effect information.

In a possible implementation mode, the second acquisition module 902 is configured to acquire the presentation special effect information of the virtual object corresponding to the shooting pose data in the reality scene based on the acquired shooting pose data and the pose data of the virtual object in the three-dimensional scene model representing the reality scene in the following manner of: acquiring the presentation special effect information of the virtual object corresponding to the shooting pose data based on the acquired shooting pose data, the pose data of the virtual object in the three-dimensional scene model, and the three-dimensional scene model.

In a possible implementation mode, the AR scene image processing apparatus further includes a generation module 904. The generation module 904 is configured to generate the three-dimensional scene model in the following manner of: acquiring multiple reality scene images corresponding to the reality scene; and generating the three-dimensional scene model based on the multiple reality scene images.

In a possible implementation mode, the generation module 904 is configured to generate the three-dimensional scene model based on the multiple reality scene images in the following manner of: extracting multiple feature points from each reality scene image in the acquired multiple reality scene images; and generating the three-dimensional scene model based on the extracted multiple feature points and a pre-stored three-dimensional sample image matched with the reality scene. The three-dimensional sample image includes a pre-stored three-dimensional image representing a morphology feature of the reality scene.

In a possible implementation mode, the first acquisition module 901 is configured to acquire the shooting pose data of the AR device in the following manner of: acquiring a reality scene image shot by the AR device; and determining shooting pose data corresponding to the reality scene image based on the reality scene image and a pre-stored first neural network model for positioning. The shooting pose data includes shooting position information and/or shooting orientation information.

In a possible implementation mode, the AR scene image processing apparatus further includes a first model training module 905. The first model training module 905 is configured to train the first neural network model according to the following step of: training the first neural network model based on multiple sample images obtained by shooting the reality scene in advance and shooting pose data corresponding to each sample image.

In a possible implementation mode, the first acquisition module 901 is configured to acquire the shooting pose data of the AR device in the following manner of: acquiring a reality scene image shot by the AR device; and determining shooting pose data corresponding to the reality scene image based on the reality scene image and an aligned three-dimensional sample image. The shooting pose data includes shooting position information and/or shooting orientation information, the aligned three-dimensional sample image is a three-dimensional sample image obtained after feature point alignment of a sample image library obtained by shooting the reality scene in advance with the pre-stored three-dimensional sample image, and the pre-stored three-dimensional sample image is a pre-stored three-dimensional image representing the morphology feature of the reality scene.

In a possible implementation mode, the first acquisition module 901 is configured to determine the shooting pose data corresponding to the reality scene image based on the reality scene image and the aligned three-dimensional sample image in the following manner of: determining a feature point, matched with a feature point in the shot reality scene image, in the three-dimensional sample image based on the aligned three-dimensional sample image; determining a target sample image matched with the reality scene image in the sample image library based on coordinate information of the matched feature point in the three-dimensional sample image in the aligned three-dimensional sample image, where the sample image library includes a sample image obtained by shooting the reality scene in advance and shooting pose data corresponding to each sample image; and determining the shooting data corresponding to the target sample image as the shooting pose data corresponding to the reality scene image.

In a possible implementation mode, the first acquisition module 901 is further configured to acquire a reality scene image shot by the AR device and determine attribute information corresponding to the reality scene image based on the reality scene image and a pre-stored second neural network model that is configured to determine the attribute information of the reality scene image. The second acquisition module 902 is configured to acquire the presentation special effect information of the virtual object corresponding to the shooting pose data in the reality scene based on the shooting pose data and the pose data of the virtual object in the three-dimensional scene model representing the reality scene in the following manner of: acquiring the presentation special effect information of the virtual object corresponding to the shooting pose data in the reality scene based on the shooting pose data, the attribute information, and the pose data of the virtual object in the three-dimensional scene model representing the reality scene.

In a possible implementation mode, the AR scene image processing apparatus further includes a second model training module 906. The second model training module 906 is configured to train the second neural network model according to the following step of: training the second neural network model based on multiple sample images obtained by shooting the reality scene in advance and shooting attribute information corresponding to each sample image.

In a possible implementation mode, the first acquisition module 901 is further configured to: after acquiring the shooting pose data of the AR device, acquire a preset identifier of the reality scene shot by the AR device, and determine additional virtual object information corresponding to the reality scene based on the preset identifier and a pre-stored mapping relationship between a preset identifier and additional virtual object information. The second acquisition module 902 is configured to acquire the presentation special effect information of the virtual object corresponding to the shooting pose data in the reality scene based on the shooting pose data and the pose data of the virtual object in the three-dimensional scene model representing the reality scene in the following manner of: acquiring the presentation special effect information of the virtual object corresponding to the shooting pose data in the reality scene based on the shooting pose data, the additional virtual object information, and the pose data of the virtual object in the three-dimensional scene model representing the reality scene.

In a possible implementation mode, the displaying module 903 is further configured to: after displaying the AR scene image through the AR device based on the presentation special effect information, acquire a triggering operation for the virtual object displayed in the AR device and update the presentation special effect information presented in the AR scene image.

In a possible implementation mode, the virtual object includes a target musical instrument; and the displaying module 903 is configured to acquire the triggering operation for the virtual object presented in the AR device and update the presentation special effect information presented in the AR scene image in the following manner of: acquiring the triggering operation for the virtual object displayed in the AR device and controlling the AR device to update a sound playing effect of the virtual object to a sound playing effect corresponding to the triggering operation.

In a possible implementation mode, the virtual object includes a target musical instrument, and there are multiple AR devices; and the displaying module 903 is configured to acquire the triggering operation for the virtual object displayed in the AR device and update the presentation special effect information presented in the AR scene image in the following manner of: acquiring multiple triggering operations for the same virtual object presented in the multiple AR devices and controlling the multiple AR devices to update a sound playing effect of the same virtual object to a mixed sound playing effect corresponding to the multiple triggering operations for the same virtual object.

In a possible implementation mode, the virtual object includes a target musical instrument, and there are multiple AR devices; and the displaying module 903 is configured to acquire the triggering operation for the virtual object displayed in the AR device and update the presentation special effect information presented in the AR scene image in the following manner of: acquiring a triggering operation for at least one virtual object displayed in at least one AR device of the multiple AR devices and controlling the at least one AR device to update a sound playing effect of the at least one virtual object to a mixed sound playing effect corresponding to the triggering operation for the at least one virtual object.

Figure 12:
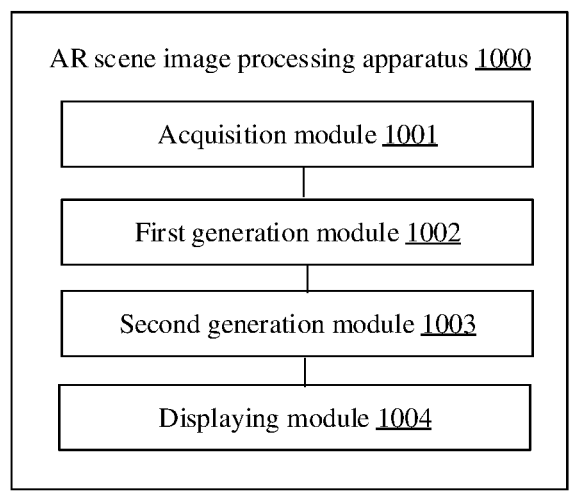
FIG. 12 is a schematic structure diagram of another AR scene image processing apparatus according to an embodiment of the disclosure.

As shown in FIG. 12, an AR scene image processing apparatus 1000 provided in an embodiment of the disclosure includes an acquisition module 1001, a first generation module 1002, a second generation module 1003 and a displaying module 1004.

The acquisition module 1001 is configured to acquire multiple reality scene images corresponding to a reality scene. The first generation module 1002 is configured to generate a three-dimensional scene model representing the reality scene based on the multiple reality scene images. The second generation module 1003 is configured to generate presentation special effect information of a virtual object in an AR scene based on the three-dimensional scene model and the virtual object matched with the reality scene. The displaying module 1004 is configured to display an AR scene image through an AR device based on the presentation special effect information.

In a possible implementation mode, the first generation module 1002 is configured to generate the three-dimensional scene model representing the reality scene based on the multiple reality scene images in the following manner of: extracting multiple feature points from each reality scene image in the acquired multiple reality scene images; and generating the three-dimensional scene model based on the extracted multiple feature points and a pre-stored three-dimensional sample image matched with the reality scene. The three-dimensional sample image is a pre-stored three-dimensional image representing a morphology feature of the reality scene.

In some embodiments, functions or templates of the apparatus provided in the embodiments of the disclosure may be configured to execute the method described in the method embodiment and implementation thereof may refer to the descriptions about the method embodiment, and will not be elaborated herein for simplicity.

Figure 13:
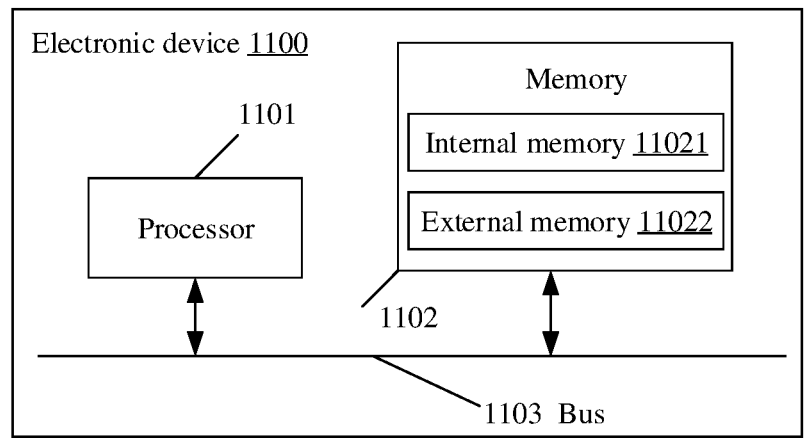
FIG. 13 is a schematic structure diagram of an electronic device according to an embodiment of the disclosure.

The embodiments of the disclosure also provide an electronic device 1100. FIG. 13 is a structure diagram of an electronic device according to an embodiment of the disclosure. The electronic device includes: a processor 1101, a memory 1102 and a bus 1103.

The memory 1102 is configured to store executable instructions, and includes an internal memory 11021 and an external memory 11022. Here, the internal memory 11021, also called an internal storage, is configured to temporarily store processing data in the processor 1101 and data exchanged with the external memory 11022 such as a hard disk. The processor 1101 performs data exchange with the external memory 11022 through the internal memory 11021. When the electronic device 1100 operates, the processor 1101 communicates with the memory 1102 through the bus 1103 such that the processor 1101 executes the following instructions of: acquiring shooting pose data of an AR device; acquiring presentation special effect information of a virtual object corresponding to the shooting pose data in a reality scene based on the shooting pose data and pose data of the virtual object in a three-dimensional scene model representing the reality scene; and displaying an AR scene image through the AR device based on the presentation special effect information.

Figure 14:
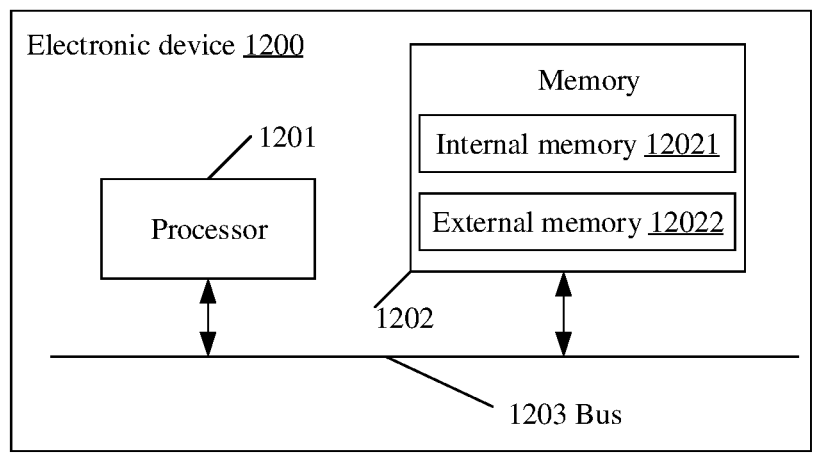
FIG. 14 is a schematic structure diagram of another electronic device according to an embodiment of the disclosure.

The embodiments of the disclosure also provide an electronic device 1200. FIG. 14 is a structure diagram of an electronic device according to an embodiment of the disclosure. The electronic device includes: a processor 1201, a memory 1202 and a bus 1203.

The memory 1202 is configured to store executable instructions, and includes an internal memory 12021 and an external memory 12022. Here, the internal memory 12021, also called an internal storage, is configured to temporarily store processing data in the processor 1201 and data exchanged with the external memory 12022 such as a hard disk. The processor 1201 performs data exchange with the external memory 12022 through the internal storage 12021. When the electronic device 1200 operates, the processor 1201 communicates with the memory 1202 through the bus 1203 such that the processor 1201 executes the following instructions of: acquiring multiple reality scene images corresponding to a reality scene; generating a three-dimensional scene model representing the reality scene based on the multiple reality scene images; generating presentation special effect information of a virtual object in an AR scene based on the three-dimensional scene model and the virtual object matched with the reality scene; and displaying an AR scene image through an AR device based on the presentation special effect information.

The embodiments of the disclosure also provide a computer-readable storage medium, in which a computer program is stored. The computer program is executed by a processor to implement the steps of the AR scene image processing method in the foregoing method embodiments.

A computer program product for an AR scene image processing method is provided in the embodiments of the disclosure, and includes a computer-readable storage medium storing a program code, where instructions included in the program code may be configured to execute the steps of the AR scene image processing method in the foregoing method embodiments, details thereof may refer to the foregoing method embodiment and will not elaborated herein.

As a person skilled in the art will readily appreciate that the operation processes of the system and device described above may refer to the corresponding processes in the method embodiments and will not be elaborated herein for convenient and brief description. In the embodiments provided by the disclosure, it is to be understood that the disclosed system, device and method may be implemented in another manner. The device embodiments described above are only schematic, and for example, division of the units is only logic function division, and other division manners may be adopted during practical implementation. For another example, multiple units or components may be combined or integrated into another system, or some features may be neglected or not executed. In addition, displayed or discussed mutual coupling, direct coupling, or a communication connection may be indirect coupling or communication connection through some communication interfaces, devices or units, and may be electrical, mechanical or in other forms.

The units described as separate parts may or may not be physically separated, and parts displayed as units may or may not be physical units, and namely may be located in the same place, or may also be distributed to multiple network units. Part or all of the units may be selected to achieve the purposes of the solutions of the embodiments according to a practical requirement.

In addition, various functional units in each embodiment of the disclosure may be integrated into a processing unit, each unit may also physically exist independently, or two or more than two units may also be integrated into a unit.

If the functions are implemented in the form of software functional units and functions as an independent product for sale or use, it may also be stored in a non-transitory computer-readable storage medium executable by the processor. Based on such an understanding, the technical solutions of the disclosure substantially or parts making contributions to the conventional art or part of the technical solutions may be embodied in the form of software product, and the computer software product is stored in a storage medium, including a plurality of instructions configured to enable a computer device (which may be a personal computer, a server, a network device or the like) to execute all or part of the steps of the method in the embodiments of the disclosure. The storage medium includes: various media capable of storing program codes such as a U disk, a mobile hard disk, a Read-Only Memory (ROM), a Random Access Memory (RAM), a magnetic disk or an optical disk.

It is finally to be noted that the above embodiments are only the implementation modes of the disclosure used to describe the technical solutions of the disclosure and shall not be constructed as a limitation, the protection scope of the disclosure being not limited thereto. Although the disclosure is described with reference to the embodiments in detail, those of ordinary skill in the art should know that those skilled in the art may still make modifications or apparent variations to the technical solutions defined in the embodiments or make equivalent replacements to part of technical features within the technical scope disclosed in the disclosure and these modifications, variations or replacements do not make the essence of the corresponding technical solutions departs from the spirit and scope of the technical solutions of the embodiments of the disclosure and shall fall within the scope of protection of the disclosure. Therefore, the protection scope of the disclosure shall be subject to the protection scope of the claims.

INDUSTRIAL APPLICABILITY

In the embodiments of the disclosure, presentation special effect information of a virtual object in a reality scene is determined based on shooting pose data of an AR device and preset pose data of the virtual object in a three-dimensional scene model representing the reality scene. Since the three-dimensional scene model may represent the reality scene, the pose data, constructed based on the three-dimensional scene model, of the virtual object may be better fused to the reality scene. The presentation special effect information matched with the pose data of the AR device is determined from the pose data of the virtual object in the three-dimensional scene model, such that a realistic AR scene is displayed in the AR device.

The invention claimed is:

1. An Augmented Reality (AR) scene image processing method, comprising:
   acquiring shooting pose data of an AR device;
   acquiring presentation special effect information of a virtual object corresponding to the shooting pose data in a reality scene based on the shooting pose data and pose data of the virtual object in a three-dimensional scene model configured to represent the reality scene; and
   displaying an AR scene image through the AR device based on the presentation special effect information,
   wherein the three-dimensional scene model is generated in the following manner:
      acquiring multiple reality scene images corresponding to the reality scene; and
      generating the three-dimensional scene model based on the multiple reality scene images;
   wherein generating the three-dimensional scene model based on the multiple reality scene images comprises:
      extracting multiple feature points from each reality scene image of the multiple reality scene images; and
      generating the three-dimensional scene model based on the multiple feature points and a pre-stored three-dimensional sample image matched with the reality scene, wherein the pre-stored three-dimensional sample image comprises a pre-stored three-dimensional image representing a morphology feature of the reality scene.

2. The method of claim 1, wherein acquiring the presentation special effect information of the virtual object corresponding to the shooting pose data in the reality scene based on the shooting pose data and the pose data of the virtual object in the three-dimensional scene model configured to represent the reality scene comprises:
   acquiring the presentation special effect information of the virtual object corresponding to the shooting pose data based on the shooting pose data, the pose data of the virtual object in the three-dimensional scene model, and the three-dimensional scene model.

3. The method of claim 1, wherein acquiring the shooting pose data of the AR device comprises:
acquiring a reality scene image shot by the AR device; and
determining shooting pose data corresponding to the reality scene image based on the reality scene image and a pre-stored first neural network model for positioning, wherein the shooting pose data corresponding to the reality scene image comprises at least one of shooting position information or shooting orientation information.

4. The method of claim 3, wherein the pre-stored first neural network model is trained according to the following step:
training the pre-stored first neural network model based on multiple sample images obtained by shooting of the reality scene in advance and shooting pose data corresponding to each of the multiple sample images.

5. The method of claim 1, wherein acquiring the shooting pose data of the AR device comprises:
acquiring a reality scene image shot by the AR device; and
determining shooting pose data corresponding to the reality scene image based on the reality scene image and an aligned three-dimensional sample image, wherein the shooting pose data corresponding to the reality scene image comprises at least one of shooting position information or shooting orientation information, and the aligned three-dimensional sample image is a three-dimensional sample image obtained after feature point alignment of a sample image library obtained by shooting of the reality scene in advance and the pre-stored three-dimensional sample image.

6. The method of claim 5, wherein determining the shooting pose data corresponding to the reality scene image based on the reality scene image and the aligned three-dimensional sample image comprises:
determining a feature point, matched with a feature point in the reality scene image, in the three-dimensional sample image based on the aligned three-dimensional sample image;
determining a target sample image matched with the reality scene image in the sample image library based on coordinate information of the feature point in the three-dimensional sample image in the aligned three-dimensional sample image, wherein the sample image library comprises multiple sample images obtained by shooting of the reality scene in advance and shooting pose data corresponding to each of the multiple sample images; and
determining the shooting pose data corresponding to the target sample image as the shooting pose data corresponding to the reality scene image.

7. The method of claim 1, wherein after acquiring the shooting pose data of the AR device, the method further comprises:
acquiring a reality scene image shot by the AR device; and
determining attribute information corresponding to the reality scene image based on the reality scene image and a pre-stored second neural network model that is configured to determine the attribute information corresponding to the reality scene image, wherein
acquiring the presentation special effect information of the virtual object corresponding to the shooting pose data in the reality scene based on the shooting pose data and the pose data of the virtual object in the three-dimensional scene model configured to represent the reality scene comprises:
acquiring the presentation special effect information of the virtual object corresponding to the shooting pose data in the reality scene based on the shooting pose data, the attribute information, and the pose data of the virtual object in the three-dimensional scene model configured to representing the reality scene.

8. The method of claim 7, wherein the pre-stored second neural network model is trained according to the following step:
training the pre-stored second neural network model based on multiple sample images obtained by shooting of the reality scene in advance and attribute information corresponding to each of the multiple sample images.

9. The method of claim 1, wherein after acquiring the shooting pose data of the AR device, the method further comprises:
acquiring a preset identifier of a reality scene shot by the AR device; and
determining additional virtual object information corresponding to the reality scene shot by the AR device based on the preset identifier and a pre-stored mapping relationship between preset identifiers and the additional virtual object information,
wherein acquiring the presentation special effect information of the virtual object corresponding to the shooting pose data in the reality scene based on the shooting pose data and the pose data of the virtual object in the three-dimensional scene model configured to represent the reality scene comprises:
acquiring the presentation special effect information of the virtual object corresponding to the shooting pose data in the reality scene based on the shooting pose data, the additional virtual object information, and the pose data of the virtual object in the three-dimensional scene model configured to represent the reality scene.

10. The method of claim 1, wherein after displaying the AR scene image through the AR device based on the presentation special effect information, the method further comprises:
acquiring a triggering operation for the virtual object displayed in the AR device, and updating the presentation special effect information presented in the AR scene image.

11. The method of claim 10, wherein the virtual object comprises a target musical instrument; and acquiring the triggering operation for the virtual object displayed in the AR device and updating the presentation special effect information presented in the AR scene image comprises:
acquiring the triggering operation for the virtual object displayed in the AR device, and controlling the AR device to update a sound playing effect of the virtual object to a sound playing effect corresponding to the triggering operation.

12. The method of claim 10, wherein the virtual object comprises a target musical instrument, and in condition that there are multiple AR devices, acquiring the triggering operation for the virtual object displayed in the AR device and updating the presentation special effect information presented in the AR scene image comprises:
acquiring multiple triggering operations for a same virtual object displayed in the multiple AR devices, and controlling the multiple AR devices to update a sound playing effect of the same virtual object to a mixed sound playing effect corresponding to the multiple triggering operations for the same virtual object.

13. The method of claim 10, wherein the virtual object comprises a target musical instrument, and in condition that there are multiple AR devices, acquiring the triggering operation for the virtual object displayed in the AR device and updating the presentation special effect information presented in the AR scene image comprises:

acquiring a triggering operation for at least one virtual object displayed in at least one AR device of the multiple AR devices, and controlling the at least one AR device to update a sound playing effect of the at least one virtual object to a mixed sound playing effect corresponding to the triggering operation for the at least one virtual object.

14. An electronic device, comprising a processor, a memory and a bus, wherein the memory is configured to store machine-readable instructions executable by the processor; and during operation of the electronic device, the processor communicates with the memory via the bus; and wherein the machine-readable instructions, when being executed by the processor, cause the processor to execute the operations of:

acquiring shooting pose data of an Augmented Reality (AR) device;

acquiring presentation special effect information of a virtual object corresponding to the shooting pose data in a reality scene based on the shooting pose data and pose data of the virtual object in a three-dimensional scene model configured to represent the reality scene; and displaying an AR scene image through the AR device based on the presentation special effect information wherein the three-dimensional scene model is generated in the following manner:

acquiring multiple reality scene images corresponding to the reality scene; and generating the three-dimensional scene model based on the multiple reality scene images;

wherein the operation of generating the three-dimensional scene model based on the multiple reality scene images comprises:

extracting multiple feature points from each reality scene image of the multiple reality scene images; and generating the three-dimensional scene model based on the multiple feature points and a pre-stored three-dimensional sample image matched with the reality scene, wherein the pre-stored three-dimensional sample image comprises a pre-stored three-dimensional image representing a morphology feature of the reality scene.

15. The electronic device of claim 14, wherein the operation of acquiring the presentation special effect information of the virtual object corresponding to the shooting pose data in the reality scene based on the shooting pose data and the pose data of the virtual object in the three-dimensional scene model configured to represent the reality scene comprises:

acquiring the presentation special effect information of the virtual object corresponding to the shooting pose data based on the shooting pose data, the pose data of the virtual object in the three-dimensional scene model, and the three-dimensional scene model.

16. A non-transitory computer-readable storage medium, having stored therein a computer program, wherein the computer program, when being executed by a processor, causes the processor to implement operations of:

acquiring shooting pose data of an Augmented Reality (AR) device;

acquiring presentation special effect information of a virtual object corresponding to the shooting pose data in a reality scene based on the shooting pose data and pose data of the virtual object in a three-dimensional scene model configured to represent the reality scene; and displaying an AR scene image through the AR device based on the presentation special effect information, wherein the three-dimensional scene model is generated in the following manner:

acquiring multiple reality scene images corresponding to the reality scene; and generating the three-dimensional scene model based on the multiple reality scene images;

wherein the operation of generating the three-dimensional scene model based on the multiple reality scene images comprises:

extracting multiple feature points from each reality scene image of the multiple reality scene images; and generating the three-dimensional scene model based on the multiple feature points and a pre-stored three-dimensional sample image matched with the reality scene, wherein the pre-stored three-dimensional sample image comprises a pre-stored three-dimensional image representing a morphology feature of the reality scene.

* * * * *